United States Patent
Kim

(10) Patent No.: US 7,576,824 B2
(45) Date of Patent: Aug. 18, 2009

(54) LIQUID CRYSTAL DISPLAY DEVICE AND METHOD FOR FABRICATING THE SAME

(75) Inventor: Dong-Guk Kim, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 323 days.

(21) Appl. No.: 11/239,079

(22) Filed: Sep. 30, 2005

(65) Prior Publication Data

US 2006/0146254 A1 Jul. 6, 2006

(30) Foreign Application Priority Data

Dec. 31, 2004 (KR) ........................ 10-2004-0118478
Jun. 1, 2005 (KR) ........................ 10-2005-0046945

(51) Int. Cl.
*G02G 1/1343* (2006.01)

(52) U.S. Cl. ........................ 349/141; 349/110; 349/106

(58) Field of Classification Search ................. 349/141, 349/110, 106
See application file for complete search history.

(56) References Cited

U.S. PATENT DOCUMENTS

| | | | | |
|---|---|---|---|---|
| 5,907,379 | A * | 5/1999 | Kim et al. ................... | 349/141 |
| 6,300,995 | B1 * | 10/2001 | Wakagi et al. .............. | 349/141 |
| 6,937,312 | B2 * | 8/2005 | Kadotani et al. ........... | 349/141 |
| 6,950,166 | B2 * | 9/2005 | Kadotani .................... | 349/141 |
| 7,092,049 | B2 * | 8/2006 | Kadotani et al. ........... | 349/110 |
| 2001/0005252 | A1 | 6/2001 | Lee et al. | |
| 2002/0118330 | A1 | 8/2002 | Lee | |
| 2002/0159016 | A1 * | 10/2002 | Nishida et al. ............. | 349/141 |
| 2003/0112393 | A1 * | 6/2003 | Watanabe et al. .......... | 349/123 |
| 2003/0184699 | A1 * | 10/2003 | Matsumoto et al. ........ | 349/141 |
| 2004/0032557 | A1 | 2/2004 | Lee et al. | |
| 2004/0125280 | A1 * | 7/2004 | Kim et al. ................... | 349/110 |
| 2004/0125303 | A1 | 7/2004 | Chung | |
| 2004/0169808 | A1 * | 9/2004 | Shih et al. ................... | 349/141 |
| 2004/0183977 | A1 * | 9/2004 | Kitagawa et al. ........... | 349/141 |
| 2004/0201811 | A1 | 10/2004 | Jun | |
| 2004/0263754 | A1 | 12/2004 | Ahn et al. | |
| 2004/0263755 | A1 | 12/2004 | Kim et al. | |
| 2005/0078256 | A1 * | 4/2005 | Hong .......................... | 349/141 |
| 2005/0099567 | A1 * | 5/2005 | Shimizu et al. ............. | 349/141 |

FOREIGN PATENT DOCUMENTS

| | | |
|---|---|---|
| EP | 1 256 836 | 11/2002 |
| GB | 2 368 447 A | 5/2002 |
| GB | 2 396 244 A | 6/2004 |
| JP | 09-073101 | 3/1997 |
| JP | 2000-111957 | 4/2000 |
| JP | 2001-033798 | 2/2001 |
| JP | 2001-066617 | 3/2001 |
| JP | 2001-166338 | 6/2001 |
| JP | 2001-222030 | 8/2001 |
| JP | 2002-258262 | 9/2002 |
| KR | 1020020037554 A | 5/2002 |

OTHER PUBLICATIONS

Search Report dated Sep. 13, 2005.

\* cited by examiner

*Primary Examiner*—David Nelms
*Assistant Examiner*—Thanh-Nhan P Nguyen
(74) *Attorney, Agent, or Firm*—McKenna Long & Aldridge LLP

(57) ABSTRACT

A liquid crystal display device includes a gate line and a data line crossing each other to define a pixel region on a substrate; common electrode parts arranged at both sides of the data line to shield the data line; a black matrix over a region including the data line and a portion of the common electrode parts; and a color filter arranged at the pixel region.

19 Claims, 8 Drawing Sheets

LIQUID CRYSTAL DISPLAY DEVICE AND METHOD FOR FABRICATING THE SAME

This application claims the benefit of Korean Patent Application Nos. 2004-118478 and 2005-46945 filed in Korea on Dec. 31, 2004, and Jun. 1, 2005, respectively, both of which are hereby incorporated by reference in their entirety.

BACKGROUND OF THE INVENTION

1. Field of the Invention

The present invention relates to a liquid crystal display device, and more particularly, to a liquid crystal display device having a color filter on thin film transistor structure and a method for fabricating the same.

2. Description of the Related Art

In general, a liquid crystal display device (LCD) displays images using the optical anisotropy and double refraction properties of liquid crystal molecules. The arrangement of the liquid crystal molecules is changed by an applied electric field. The light transmittance of the liquid crystal molecules also changes in accordance with the alignment direction of the liquid crystal molecules.

The LCD device includes two substrates facing each other. Electrodes are provided on the facing surfaces of the respective substrates for generating an electric field. A liquid crystal material is injected between the two substrates. The alignment direction of liquid crystal molecules is changed by the electric field generated by a voltage applied to the two electrodes. Thus, the LCD device displays an image by varying the light transmittance of the liquid crystal molecules in accordance with the alignment direction of the liquid crystal molecules.

FIG. 1 is a schematic plane view of the related art LCD device. Referring to FIG. 1, the related art LCD device 11 includes an upper substrate (not shown) including a color filter (not shown) and a common electrode (not shown) deposited on the color filter (not shown). The color filter (not shown) includes sub-color filters (not shown) and a black matrix (not shown) formed between the sub-color filters (not shown). A liquid crystal material (not shown) is filled between the upper substrate (not shown) and the lower substrate (not shown). The lower substrate is also called an array substrate.

Pixel regions P are defined on a lower substrate (not shown) of the LCD device. A pixel electrode (not shown) and a switching device T are formed at each pixel region. Gate lines 13 and data lines 15 lines crossing each other form an array. Crossings of the gate lines and data lines define the pixel regions P. The switching devices T, for example thin film transistors (TFT), are arranged in a matrix on the lower substrate. Each of the switching devices is electrically connected to one of the gate lines 13 and one of the data lines 15.

A transparent pixel electrode 17 is formed at each of the pixel regions P. The pixel electrode 17 is formed of transparent conductive metal having a relatively high light transmittance, such as indium-tin-oxide (ITO). Storage capacitors C are formed on the gate line 13. The storage capacitors C are electrically connected to the pixel electrodes 17 in parallel. A part of the gate line 13 is used as a first electrode of the storage capacitor C, and a source/drain metal layer 30 having an island shape and formed of the same material as source/drain electrodes of the switching device T is used as a second electrode of the storage capacitor C. The source/drain metal layer 30 contacts the pixel electrode 17 to receive signals from the pixel electrode 17.

As described above, when the liquid crystal panel is formed by attaching the upper color filter substrate (not shown) and the lower array substrate (not shown), light leakage or other problems may occur because of misalignment between the color filter substrate (not shown) and the array substrate (not shown).

FIG. 2 is a cross-sectional view taken along line II-II of FIG. 1 illustrating a method of fabricating the related art LCD device. Referring to FIG. 2, the method for fabricating the related art LCD device includes disposing an array substrate as a lower substrate 22, and a color substrate as an upper substrate 5, with a specific gap therebetween; and injecting liquid crystals 14 between the lower and upper substrates 22 and 5. Also, switching devices T (shown in FIG. 1), for example thin film transistors, and a passivation layer 40 are formed on the lower substrate 22. Each of the thin film transistors includes a gate electrode 32, an active layer 34, a source electrode 36 and a drain electrode 38. The passivation layer 40 protects the thin film transistors formed on the lower substrate 22.

A transparent pixel electrode 17 is formed at each pixel region P. The transparent pixel electrode 17 contacts the drain electrode 38 of the switching device T. Storage capacitors C (shown in FIG. 1) are formed on a gate line 13 to be electrically connected to the pixel electrodes 17 in parallel. In the related art array substrate, the data line 15 and the pixel electrode 17 are separated from each other by a specific interval A to prevent vertical cross talk. The gate line 13 and the pixel electrode 17 are also separated from each other by a specific interval B.

Red, green and blue color filters 8a, 8b and 8c are formed on the upper substrate 5 to correspond to the pixel regions P of the lower substrate 22. A black matrix 6 is also formed on the upper substrate 5 to correspond to the gate lines 13, the data lines 15 and the switching devices T. The black matrix 6 formed at the upper substrate 5 covers the gaps A and B between the data line 15 and the pixel electrode 17, and between the pixel electrode 17 and the gate line 13, to block light leaking through the gaps A and B. Also, the black matrix 6 overlies the thin film transistor T to block irradiated external light from passing through the passivation layer 40 and affecting the active layer 34.

The upper substrate 5 and the lower substrate 22 may be misaligned during the attachment process. In consideration of such misalignment, a specific margin is included when the black matrix 6 is designed. The margin causes a corresponding decrease in an aperture ratio. If the misalignment error exceeds the margin, light leakage regions A and B may not be completely covered by the black matrix 6. Thus, light leakage occurs in these regions. Accordingly, image quality deteriorates.

As described above, the related art LCD device employs a method of fabricating a color filter substrate and a thin film transistor array substrate through different processes and attaching them together. Recently, a new design concept for a thin film transistor array, called a Color Filter on TFT (COT) method in which a color filter is formed on a thin film transistor array substrate, has been introduced. The LCD device employing the COT method is fabricated in such a manner that the switching devices, for example TFTs, are formed, and then, red, green and blue color resins are formed on the TFTs.

FIG. 3 is a schematic plane view of an LCD device having a COT structure in accordance with the related art. Referring to FIG. 3, gate lines 102 and data lines 116 cross each other. A switching device T, including a gate electrode 104, an active layer 108 and source/drain electrodes 112 and 114, is formed at each crossing of these gate and data lines 102 and 116. Also, transparent electrodes (not shown) contacting the drain electrodes 114 and colors filter 124a, 124b and 124c are formed at regions defined by crossings of the gate and data lines 102 and 116. The transparent electrodes (not shown) are formed on the color filters 124a, 124b and 124c. The color filters indirectly contact the drain electrodes 114 through the transparent electrodes (not shown). Also, each of the transparent electrodes (not shown) is electrically connected to the storage capacitor C formed on the gate line 102. The storage capacitor C uses a part of the gate line 102 as a first electrode, and uses a capacitor upper electrode 118 as a second electrode. The capacitor upper electrode 118 is electrically connected to the transparent electrode (not shown) and is concurrently formed on the same layer as the source/drain electrodes 112 and 114.

In accordance with the COT structure, a black matrix 120 and the red, green and blue color filters 124a, 124b and 124c are formed on the switching device T of the array part. The black matrix 120 covers regions where light might leak. The black matrix 120 is formed by applying an opaque material, blocks light, and protects the switching device T.

FIGS. 4A to 4E are cross-sectional views taken along line IV-IV of FIG. 3 illustrating a method for fabricating an LCD device having a COT structure in accordance with the related art. Referring to FIG. 4A, a conductive material is deposited on a substrate 100. The deposited conductive material is patterned to form a gate line 102 and a gate electrode 104. Then, a gate insulation film 106, which is a first insulating film, is formed by depositing an inorganic insulating material, for example silicon nitride (SiNx) or silicon oxide (SiO2), over the entire surface of the substrate 100, including the gate line 102 and the gate electrode 104 formed thereon. Then, an active layer 108 and an ohmic contact layer 110 are formed on the gate insulation film 106 by depositing, then patterning, an intrinsic amorphous silicon (a-Si:H) and an impurity-doped amorphous silicon (n+a-Si:H) on the gate insulation film 106.

Then, a conductive metal, such as chrome (Cr), molybdenum (Mo), copper (Cu), tungsten (W), tantalum (Ta) and the like, is deposited over the entire surface of the substrate 100, including the active layer 108 and the ohmic contact layer 110 thereon. The deposited conductive metal is patterned to form a source electrode 112 and a drain electrode 114, a data line 116, and a capacitor upper electrode 118. The source electrode 112 and the drain electrode 114 contact, respectively, the ohmic contact layer 110. The data line 116 contacts the source electrode 112. The capacitor upper electrode 118 is a storage node formed on the gate line 102 and has an island shape.

Then, a second insulating film 119 is formed by depositing an inorganic insulating material, such as silicon nitride and silicon oxide, over the entire surface of the substrate 100, including the source and drain electrodes 112 and 114 thereon. The second insulating film 119 prevents a potential defective contact between the active layer 108 and an organic film (not shown) to be formed hereafter. The second insulating layer 119 is not formed if the contact is not defective.

Then, a black matrix 120 is formed over the switching device T, the data line 116 and the gate line 102 by depositing an opaque organic material on the second insulating film 119 to form an organic layer, and patterning the organic layer. In an embodiment of the present invention, a transparent organic insulating material or an inorganic insulating material having a low permittivity may be used as a passivation film for protecting the switching device T, instead of the black matrix 120. In this case, a special black matrix may be used at an upper substrate of the LCD device.

Referring to FIG. 4B, the black matrix 120 is selectively patterned. Portions of the black matrix 120 are removed at a region corresponding to a contact hole to be formed for contacting a drain electrode, at a region where the capacitor upper electrode 118 electrically contacts a common electrode. The remaining portions of the black matrix 120 overlap the thin film transistor T region and the storage capacitor C region. Then, a color resin is applied to an upper surface of the entire structure including the selectively-patterned black matrix 120 to form red, green and blue color filters 124a, 124b and 124c in a plurality of pixel regions.

Referring to FIG. 4C, an acryl resin is applied to an upper surface of the entire structure including the color filters 124a, 124b and 124c to form an overcoat layer 126.

Referring to FIG. 4D, the overcoat layer 126 and the black matrix 120 are selectively patterned to form a drain contact hole 128 and a capacitor contact hole 130 exposing parts of the drain electrode 114 and the capacitor upper electrode 118.

Referring to FIG. 4E, a transparent electrode material is deposited on the overcoat layer 126 including the drain contact hole 128 and the capacitor contact hole 130. The transparent electrode material is patterned to form a common electrode 132.

In the related art array substrate of the LCD device, the overcoat layer, such as an acryl resin, is used on the TFT lower substrate for the COT structure to prevent a decrease in a aperture ratio caused by a corresponding increase in an attachment margin when manufacturing a large glass substrate. The acryl film flattens an uneven surface generated by the organic film of the lower substrate and prevents a flow of impurity ions from the color filters to a liquid crystal layer. However, the use of the acryl material increases cost. Furthermore, although temporarily improved through a post exposure process, the transmittance of the acryl keeps decreasing during subsequent processes, thereby reducing the transmittance of the LCD panel. Therefore, to avoid such defects of the COT structure, research is actively ongoing on a COT structure that does not include acryl.

SUMMARY OF THE INVENTION

Accordingly, the present invention is directed to a liquid crystal display device having a color filter on thin film transistor structure and a method for fabricating the same that substantially obviate one or more of the problems due to limitations and disadvantages of the related art.

An object of the present invention is to provide an LCD device and a fabrication method thereof so as to be capable of preventing leakage of light caused by a disclination in a COT structure.

Another object of the present invention is to provide an LCD device and a fabrication method thereof so as to be capable of reducing a fabrication cost.

Another object of the present invention is to provide an LCD device and a fabrication method thereof so as to be capable of preventing a decrease in transmittance.

To achieve these and other advantages and in accordance with the purpose of the present invention, as embodied and broadly described herein, there is provided an array substrate of a liquid crystal display device, comprising: a gate line and a data line crossing each other and defining a pixel regions on a substrate; data line shielding common electrodes arranged at both sides of the data line; a thin film transistor formed at an crossing of the gate line and the data line; a black matrix arranged over the data line and a portion of the data line shielding common electrodes; a color filter arranged at a pixel region defined by the gate line and the data line crossing each other; and a common electrode and a pixel electrode arranged at the pixel region defined by the gate line and the data line crossing each other.

To achieve these and other advantages and in accordance with the purpose of the present invention, as embodied and broadly described herein, a liquid crystal display device includes a gate line and a data line crossing each other to define a pixel region on a substrate; common electrode parts arranged at both sides of the data line to shield the data line; a black matrix over a region including the data line and a portion of the common electrode parts; and a color filter arranged at the pixel region.

In another aspect, a method for fabricating an array substrate of a liquid crystal display device includes crossing a gate line and a data line on a substrate, thereby defining a pixel region; forming common electrode parts at both sides of the data line to shield the data line, the common electrode parts being separated from the data line; forming a thin film transistor at a region defined by the gate line and the data line crossing each other, wherein the thin film transistor includes a gate electrode, an active layer and a source electrode and a drain electrode; arranging a black matrix over the data line and a portion of the common electrode parts; forming a color filter on a pixel region defined by the gate line and the data line crossing each other; and forming a common electrode and a pixel electrode at the pixel region.

In another aspect, a liquid crystal display device includes a plurality of gate lines and a plurality of data lines crossing each other to define a pixel region on a substrate; a plurality of common electrode lines, each of the common electrode lines spaced apart from and parallel to a corresponding one of the gate lines; a pair of common electrode parts corresponding to each one of the data lines, the common electrode parts extending from the common electrode line, and arranged at both sides of the one of the data lines to shield the data lines; a black matrix over a region including the data lines and a portion of the common electrode parts; and a color filter arranged at the pixel region.

It is to be understood that both foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
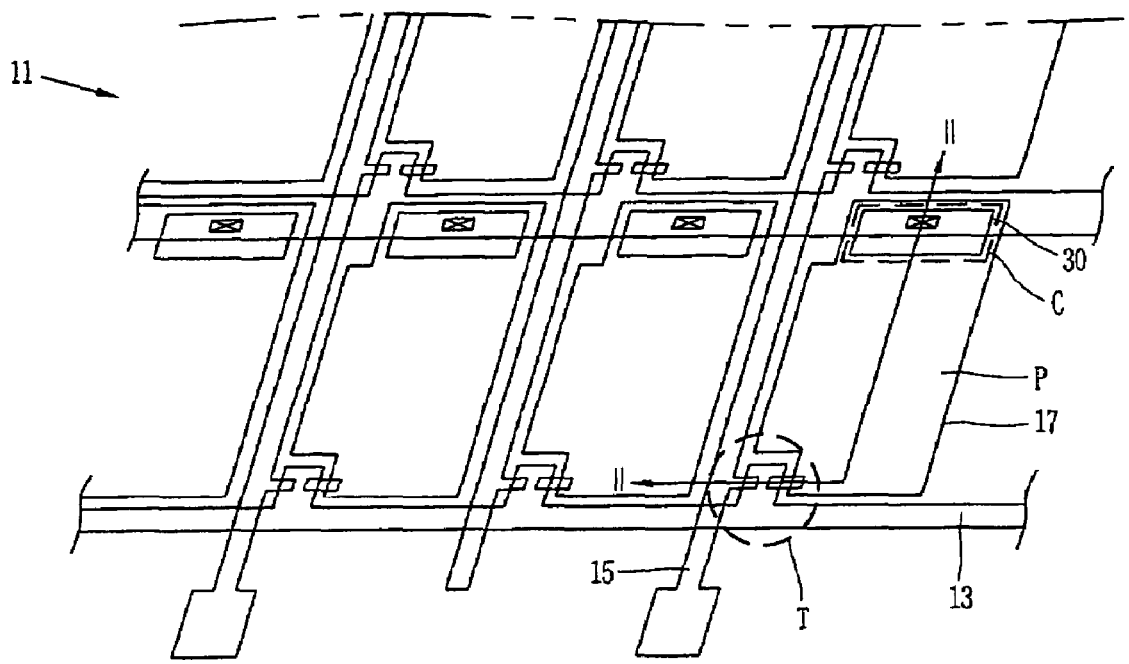
FIG. 1 is a schematic plane view of the related art LCD device.
Figure 2:
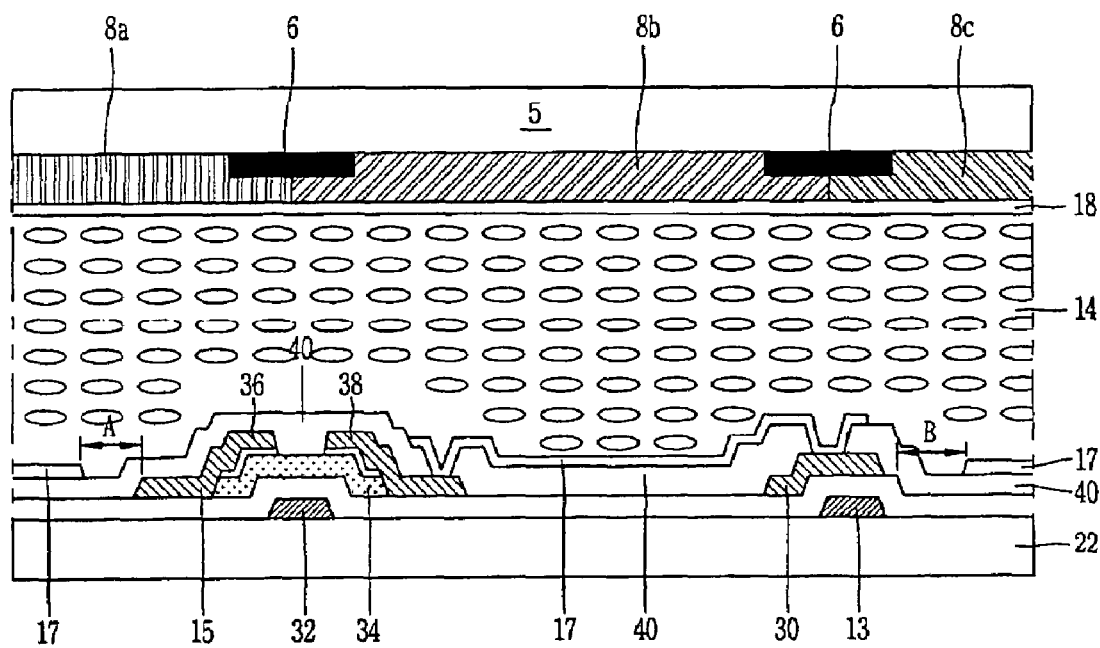
FIG. 2 is a cross-sectional view taken along line II-II of FIG. 1 illustrating a method of fabricating the related art LCD device.
Figure 3:
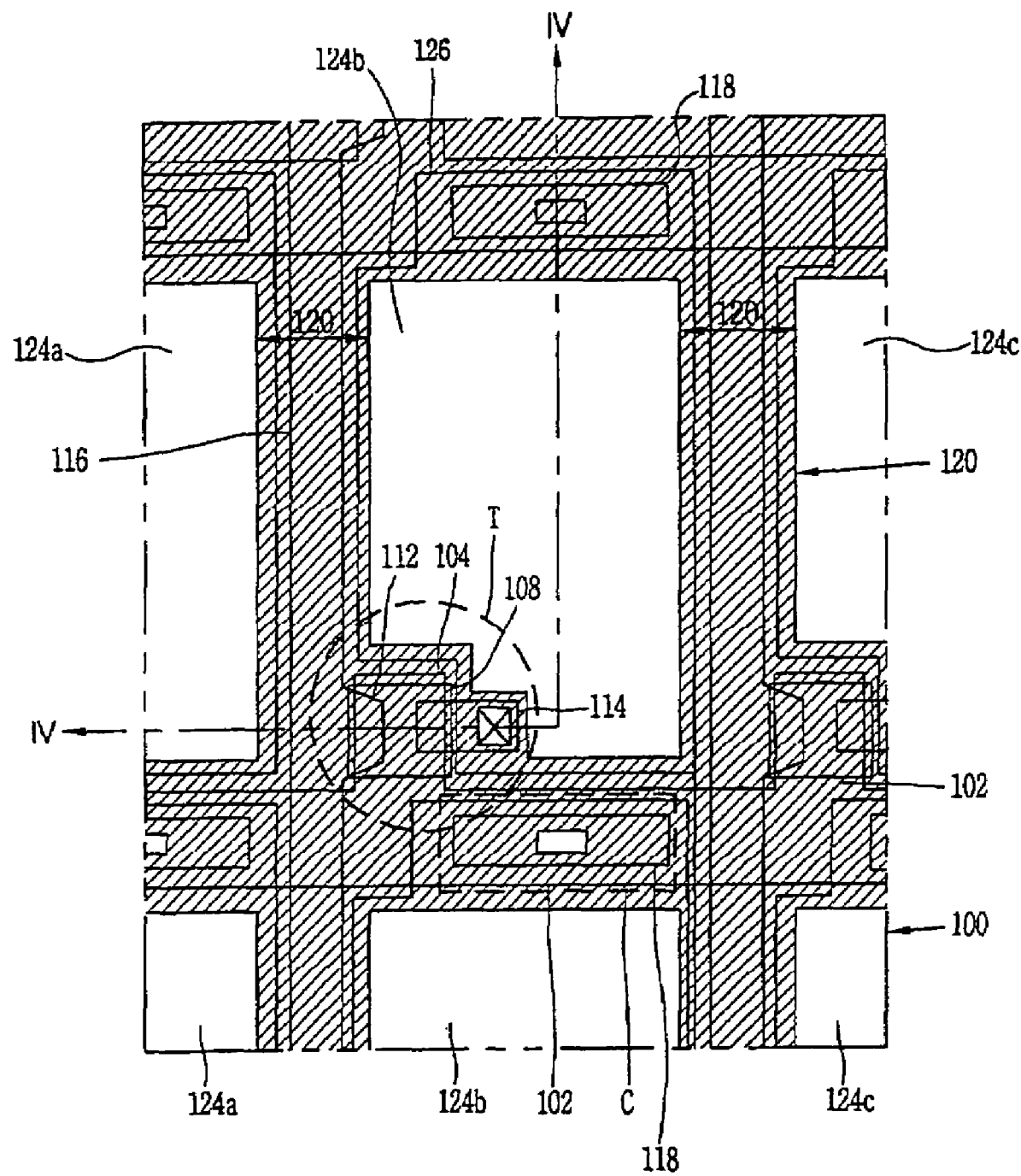
FIG. 3 is a schematic plane view of an LCD device having a COT structure in accordance with the related art.
Figure 4A:
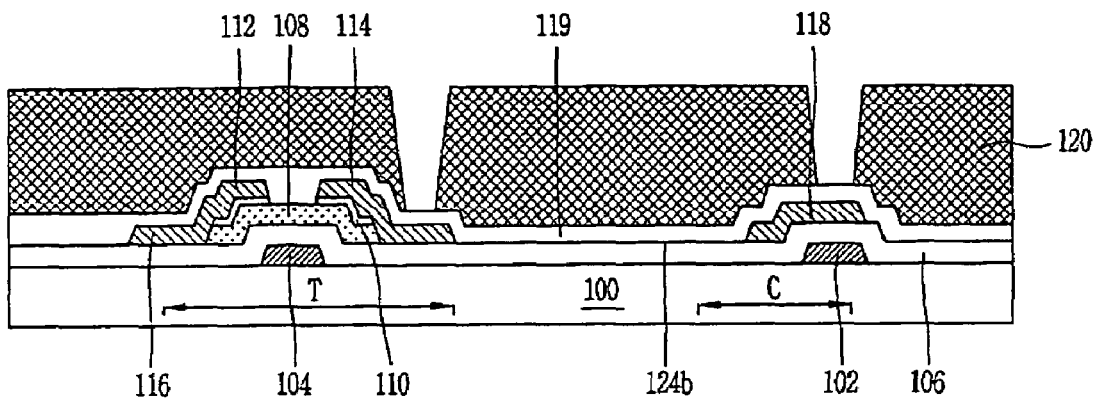
FIGS. 4A to 4E are cross-sectional views taken along line IV-IV of FIG. 3 illustrating a method for fabricating an LCD device having a COT structure in accordance with the related art.
Figure 4B:
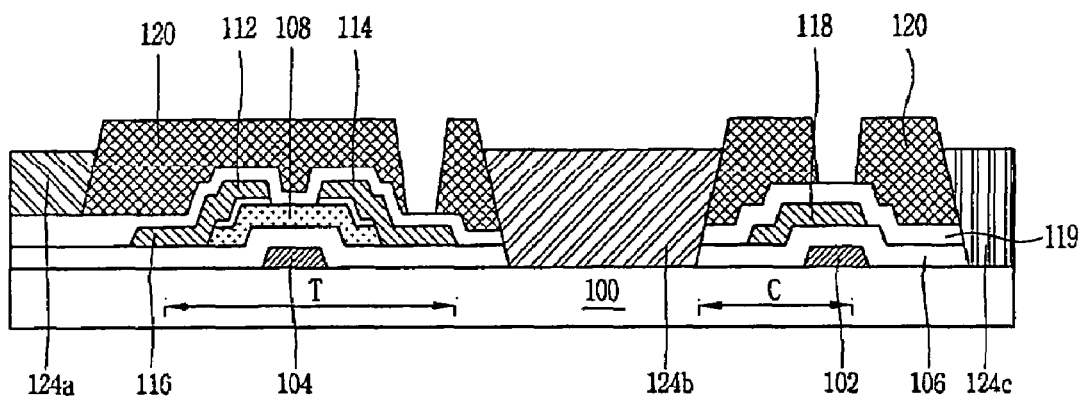
Figure 4C:
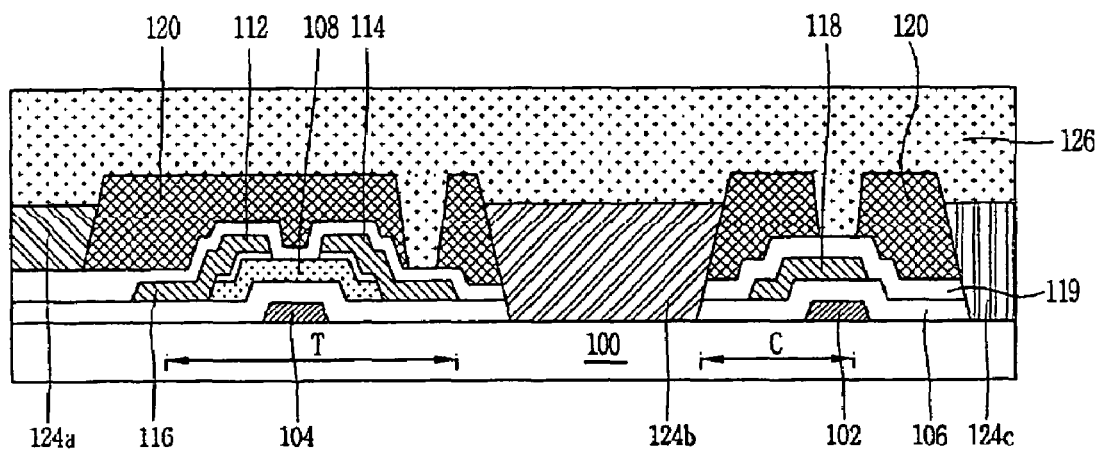
Figure 4D:
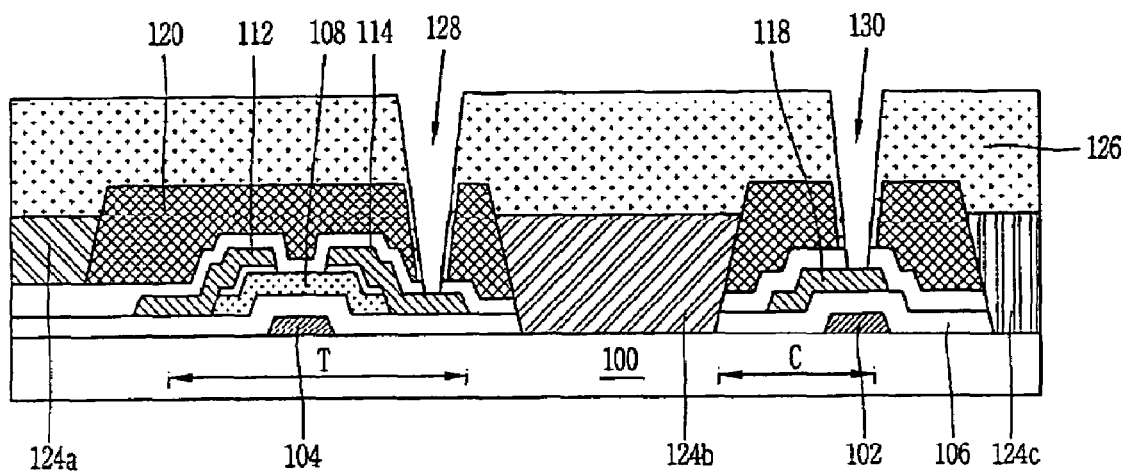
Figure 4E:
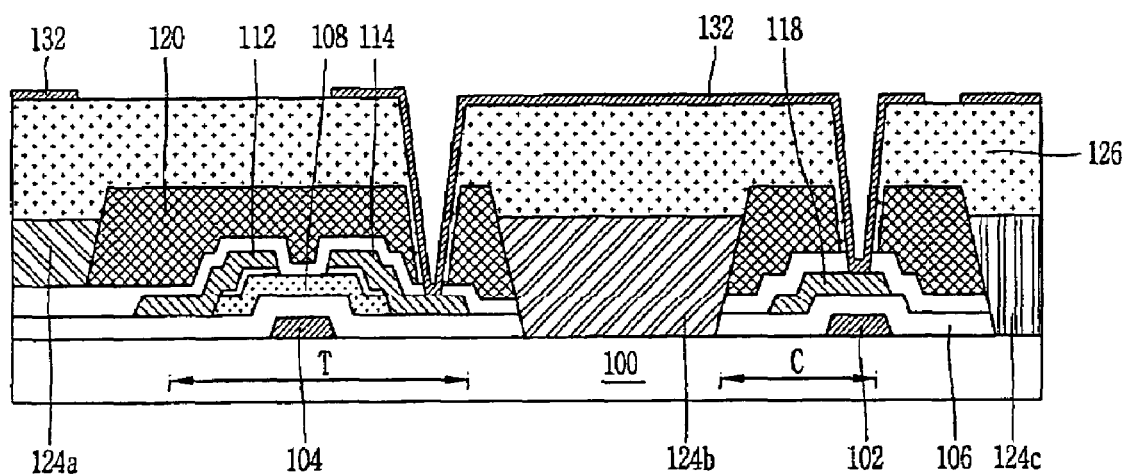
Figure 5A:
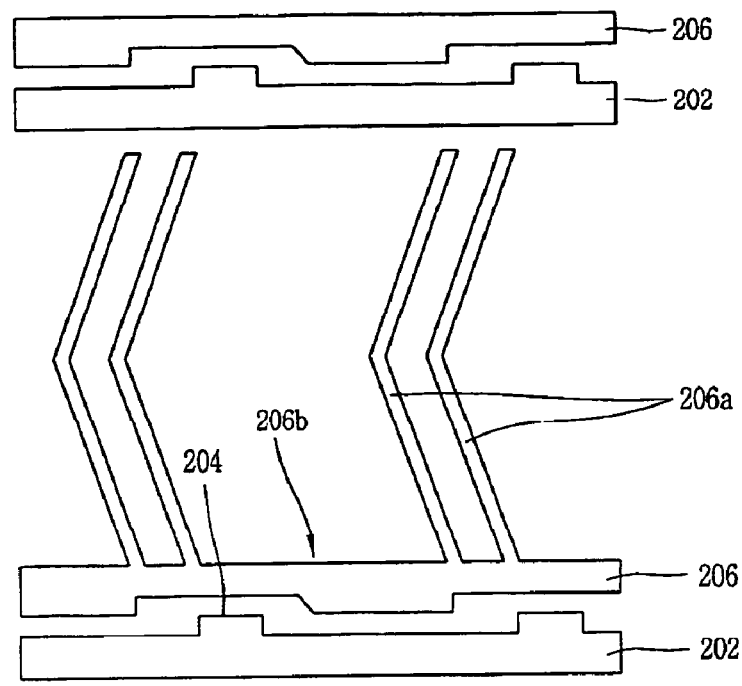
FIGS. 5A to 5D are plane views sequentially showing the layout of a liquid crystal display having a COT structure in accordance with an embodiment of the present invention.

FIGS. 5A to 5D are plane views sequentially showing the layout of a liquid crystal display having a COT structure in accordance with an embodiment of the present invention. Referring to FIG. 5A, a gate line 202 is arranged horizontally on an array substrate. A common electrode line 206 is horizontally arranged at a specific interval from the gate line 202. The common electrode line 206 includes a data line shielding common electrode part 206a vertically arranged to minimize the cross-talk level, and a storage capacitor part 206b horizontally arranged to form a storage capacitor. In one embodiment of the present invention, at least two data line shielding common electrode parts 206a are arranged to face each other at a certain interval therebetween. Also, the gate line 202 and the common electrode line 206 are simultaneously patterned in gate patterning.

Figure 5B:
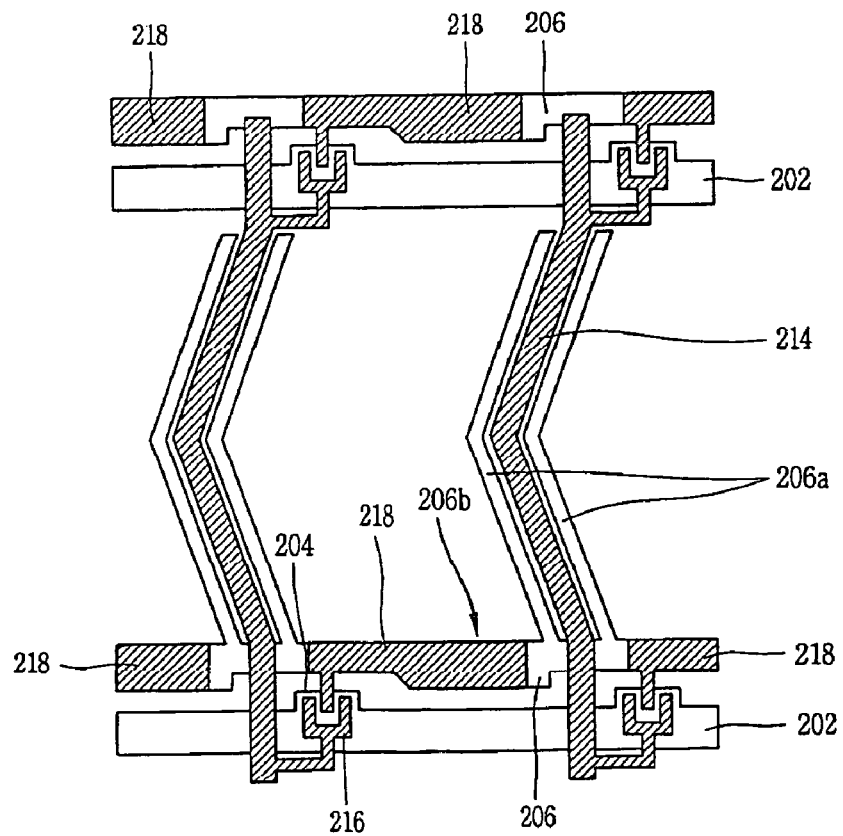

Referring to FIG. 5B, a data line 214 crossing the gate line 202 perpendicularly and source/drain electrodes 216 and 218 are arranged on the array substrate 200 (not shown). In an embodiment of the present invention, the data line 214 is arranged between a pair of adjacent data line shielding common electrode parts 206a. The data line 214 is spaced apart from the adjacent data line shielding common electrode parts 206a. The data line 214 and the adjacent data line shielding common electrode parts 206a for a zigzag pattern. Also, the drain electrode 218 overlaps the storage capacitor part 206b. Here, the drain electrode 218 and the storage capacitor part 206b of the common electrode line 206 form a capacitor.

An insulation film 220 (not shown) is deposited over the entire surface of the substrate, and a black matrix 222 (not shown) is formed thereon, overlapping the data line 214 and the data line shielding common electrode part 206a including a portion between the data line 214 and the data line shielding common electrode part 206a. Here, the black matrix 222 (not shown) overlaps the entire gate line 214 and a specific portion of the data line shielding common electrode part 206a. Also, the black matrix 222 (not shown) is arranged so as not to overlap a flattening organic film 228 (not shown) where a drain contact hole 229 is to be later formed for exposing the drain electrode 218.

A color filter layer 224 (not shown) is formed on a second insulation film 220 including a part of an upper surface of the black matrix 222 (not shown). Here, the color filter layer 224 (not shown) is formed on a pixel region formed by a crossing of the gate line 202 and the data line 214, and is arranged so as to overlap one portion of the upper surface of the black matrix 222.

Figure 5C:
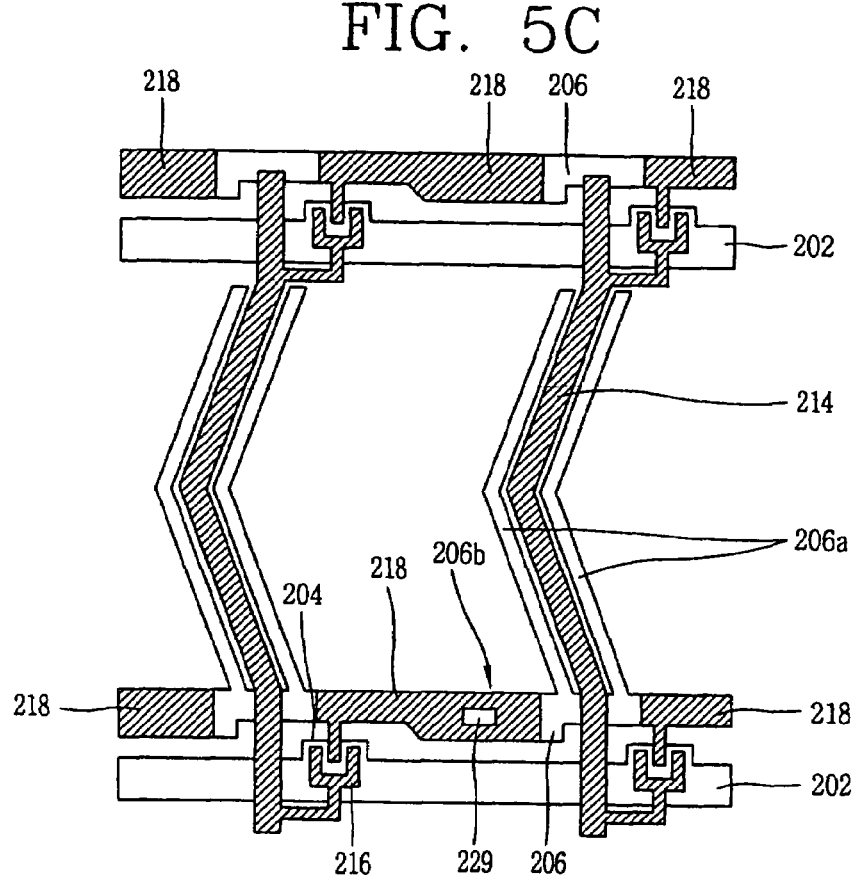

Referring to FIG. 5C, a flattening organic film 228 (not shown) is formed over the entire surface of the substrate including the black matrix 222 (not shown) and the color filter layer 224 (not shown). The flattening organic film 228 (not shown) and the second insulation film 220 (not shown) are sequentially patterned to form a drain contact hole 229 exposing the drain electrode 218. The drain contact hole 229 can be formed because a thick black matrix 222 (not shown) or a color filter layer 224 (not shown) is not placed on the flattening organic film 228 (not shown).

Figure 5D:
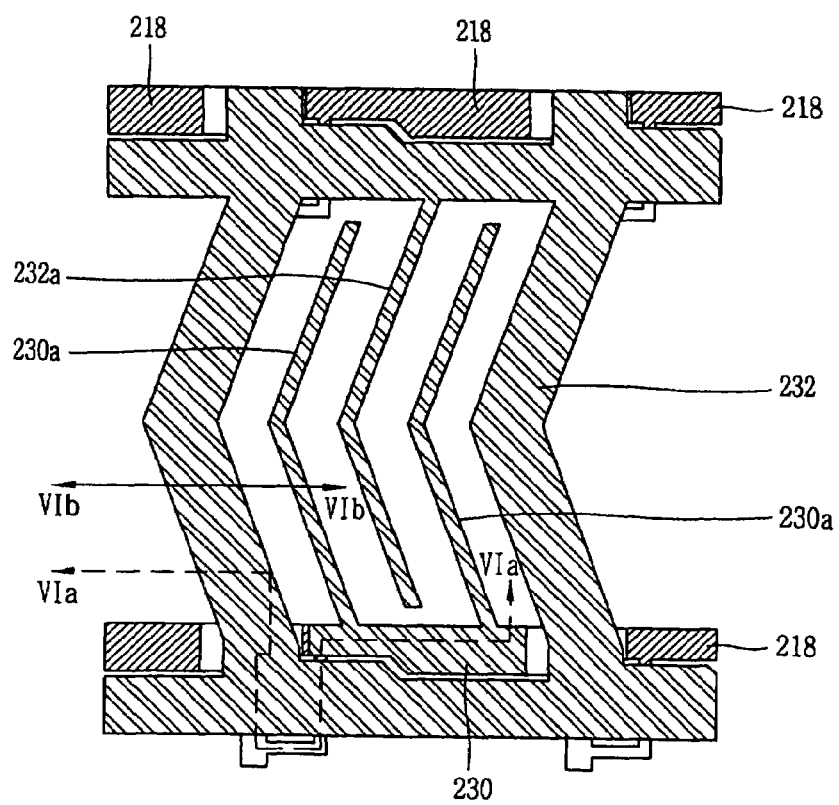

Referring to FIG. 5D, a pixel electrode 230 and a common electrode 232 are formed. The pixel electrode 230 and the common electrode 232 are electrically connected to the drain electrode 218 through the drain contact hole 229. The pixel electrode 230 overlaps the drain electrode 218. A vertical portion 230a extends from the pixel electrode 230 in a vertical direction. The common electrode 232 overlaps the gate line 202, the data line 212 and the data line shielding common electrode part 206a. A vertical portion 232a extending from the common electrode 232 is disposed between the vertical portions 230a of the pixel electrode. The common electrode 232 contacts the common electrode line 206 at an outer edge region of the pixel region. Thereby, the common electrode 232 and the common electrode line 206 are in an equipotential state. The data line shielding common electrode parts 206a reduces a vertical cross-talk level, thereby preventing a data signal from affecting an electric field between the common electrode and the pixel electrode. Thus, a reduction in an aperture ratio is prevented.

Figure 6A:
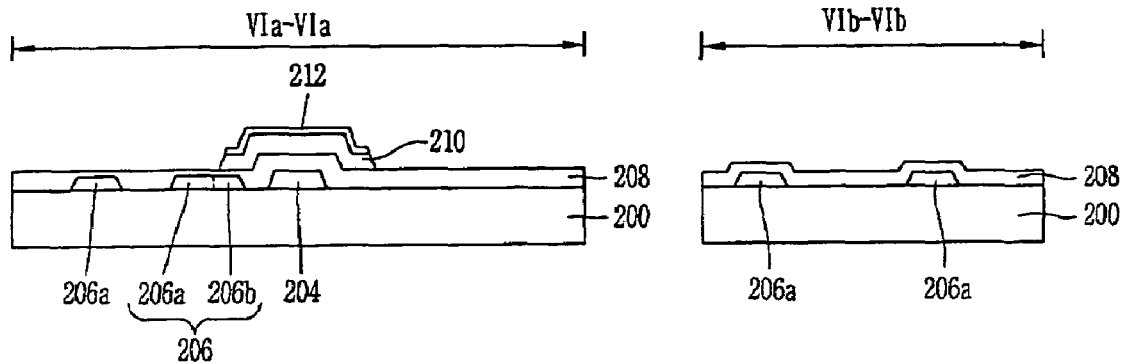
FIGS. 6A to 6F are cross-sectional views taken along lines VIa-VIa and VIb-VIb of FIG. 5D illustrating a method for fabricating an LCD device having a COT structure in accordance with an embodiment of the present invention.

FIGS. 6A to 6F are cross-sectional views taken along lines VIa-VIa and VIb-VIb of FIG. 5D illustrating a method for fabricating an LCD device having a COT structure in accordance with an embodiment of the present invention. Referring to FIG. 6A, a conductive metal is deposited on a substrate 200. The deposited conductive metal is patterned to form a gate line 202 (shown in FIG. 5A) and a gate electrode 204. Concurrently, pairs of data line shielding common electrode parts 206a are formed. Then, a gate insulation film 208 if formed as a first insulating film by depositing an inorganic insulating material, such as silicon nitride (SiNx) and silicon oxide (SiO2), over the entire surface of the substrate 200, including the data line shielding common electrode parts 206a, the gate line 202 (shown in FIG. 5A) and the gate electrode 204. Then, an active layer 210 and an ohmic contact layer 212 are formed on the gate insulation film 208 by depositing thereon, and patterning, an intrinsic amorphous silicon (a-Si:H) and an impurity-doped amorphous silicon (n+a-Si:H).

Figure 6B:
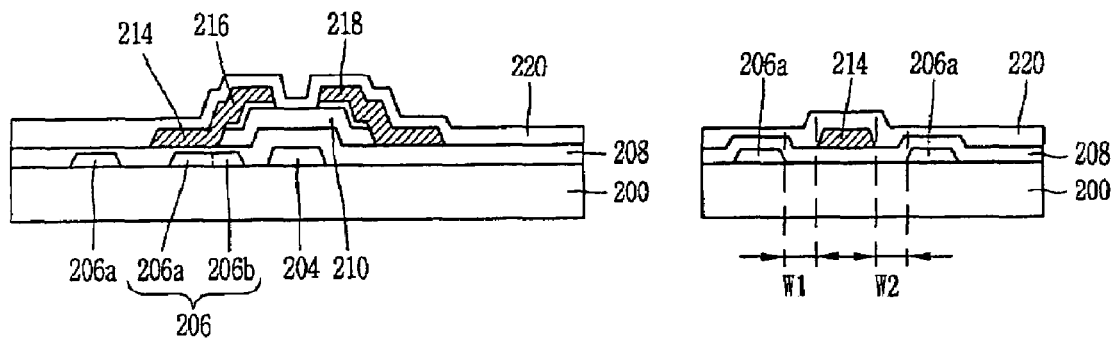

Referring to FIG. 6B, a data line 214, a source electrode 216, and a drain electrode 218 extending from the data line 214 are formed by depositing and patterning a conductive metal, such as chrome (Cr), molybdenum (Mo), copper (Cu), tungsten (W), tantalum (Ta) and the like over the entire surface of the substrate 200, including the active layer 210 and the ohmic contact layer 212 thereon. The source electrode 216 and the drain electrode 218 respectively contact the ohmic contact layer 212. While patterning the data line 214, a capacitor upper electrode (not shown) electrically contacting the source electrode 216 is also formed on the gate line 202. The data line 214 is separated from the adjacent data line shielding common electrode parts 206a by intervals of W1 and W2, respectively.

Then, a second insulating film 220 is formed by depositing an inorganic insulating material, such as silicon nitride and silicon oxide, over the entire surface of the substrate 200, including the source and drain electrodes 216 and 218 thereon. The second insulating film 220 prevents a potential defective contact between the active layer 210 and an organic film (not shown) to be later formed. The second insulating film 220 may not be formed if there is no defective contact between the active layer 210 and the organic film to be formed.

Figure 6C:
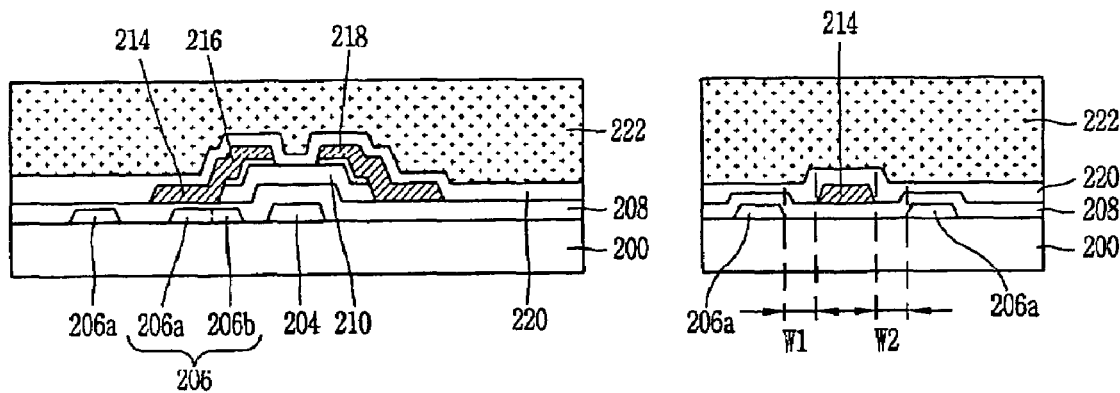

Referring to FIG. 6C, a black matrix 222 is formed by applying an opaque glass material on the entire surface of the substrate 200 including the second insulating film 220 thereon. Instead of a black matrix, a transparent organic insulating material or an inorganic insulating material having a low permittivity may be used as a passivation film for protecting the switching device T. In this case, a special black matrix is used at an upper substrate of the LCD device.

Figure 6D:
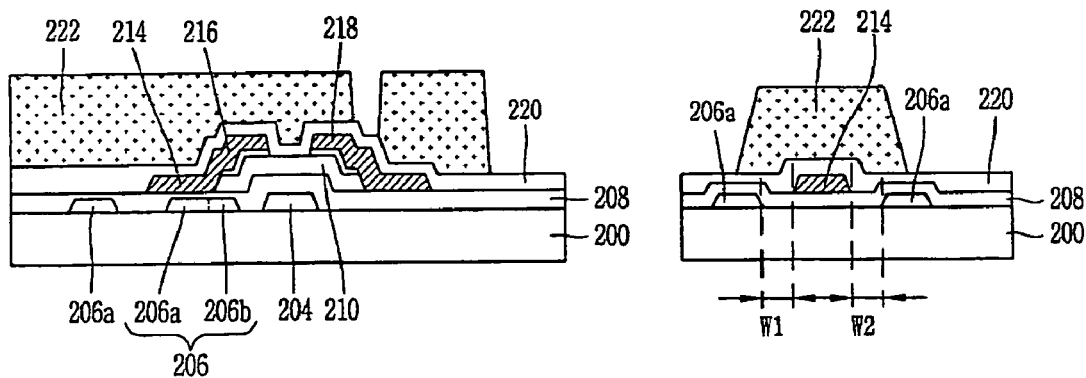

Referring to FIG. 6D, the black matrix 222 is selectively patterned to overlap the data line 214 and a portion of the data line shielding common electrode parts 206a including a portion between the data 214 and the data line shielding common electrode part 206a. Also, the patterned black matrix 222 has an edge overlapping the data line shielding common electrode parts 206a. A portion of the black matrix 222 is removed to expose a portion of the second insulation film 220 corresponding to a contact hole region to be formed for contacting the drain electrode 218.

Figure 6E:
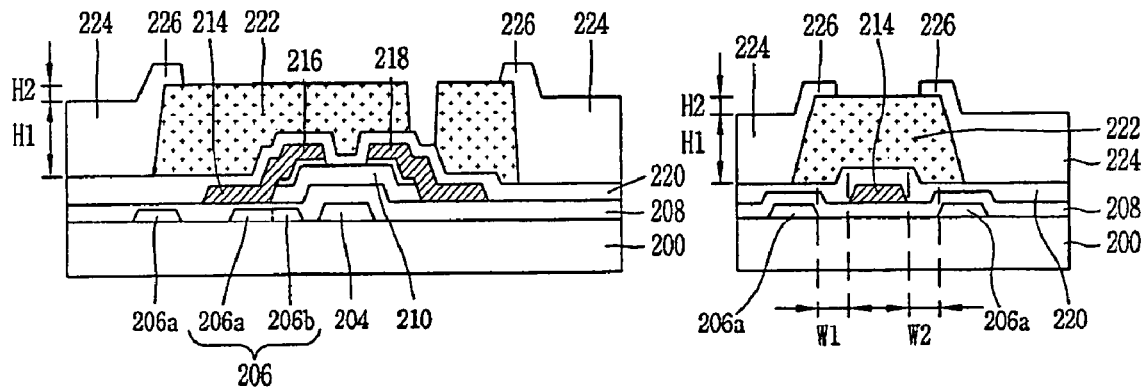

Referring to FIG. 6E, a color resin is applied to an upper surface of the entire structure including the selectively-patterned black matrix 222, thereby forming red, green and blue color filters 224 at a plurality of pixel regions. An uneven portion 226 is formed at a region where the color filter 224 overlaps the black matrix 222, and a rubbing direction is twisted at the uneven inclined portion 226, which causes a disclination. To avoid such problems, as shown in FIG. 6D, the black matrix 222 overlaps an interval W1 between the data line 214 and the data line shielding common electrode part 206a and an interval W2 between the data line 214 and the data line shielding common electrode part 206a, thereby blocking light from a backlight in the disclination regions. Also, to reduce the level of unevenness caused by the absence of an acryl overcoat layer, the black matrix 222 may be of the same height as the color filter 224, or the height difference H2 between the black matrix 222 and the color filter 224 may be smaller than 0.2*H1, where H1 the thickness of the color filter 224.

Figure 6F:
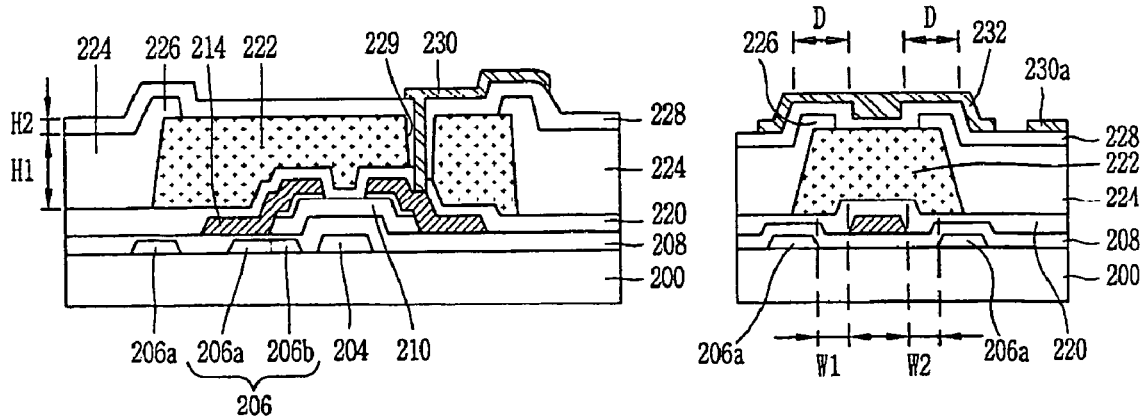

Referring to FIG. 6F, instead of an overcoat layer formed using an acryl resin, a third insulating film 228 is formed by depositing an inorganic insulating material, such as silicon nitride (SiNx) and silicon oxide (SiO2), over an upper surface of the array substrate including the color filter 224. Then, the third insulating film 228 is selectively removed to form a drain contact hole 229 (shown in FIG. 5C) exposing the drain electrode 218. A transparent electrode material, such as ITO, is deposited on the third insulating film 228 including the drain contact hole 229. Then, the transparent electrode layer is selectively patterned to form a pixel electrode 230 and a common electrode 232 electrically connected to the drain electrode 218. Then, a flattening film (not shown) is formed over the entire surface of the array substrate 200 and an alignment film (not shown) is formed thereon.

In an embodiment of the present invention, a height difference between the color filter and the black matrix is minimized, thereby minimizing unevenness due to the absence of an acryl overcoat layer. Also, manufacturing cost may be reduced. Furthermore, a decrease in transmittance may be prevented because an expensive acryl resin is not used. Also, because the black matrix is patterned with its edge overlying the data line shielding electrode parts, light leakage is completely blocked in disclination regions.

It will be apparent to those skilled in the art that various modifications and variation can be made in the liquid crystal display device having a color filter on thin film transistor structure and the method for fabricating the same of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   a gate line and a data line crossing each other to define a pixel region on a substrate;
   common electrode parts arranged at both sides of the data line to shield the data line;
   a black matrix over a region including the data line and a portion of the common electrode parts, wherein the black matrix overlaps portions of the substrate between the data line and the common electrode parts;
   a color filter arranged at the pixel region; and
   a common electrode and pixel electrode at the pixel region and the black matrix,
   wherein the common electrode overlaps the gate line, the data line and the common electrode parts.

2. The device of claim 1, further comprising a capacitor electrode line spaced apart from the gate line and horizontally formed.

3. The device of claim 2, wherein the common electrode parts extend from a common electrode line spaced apart from and parallel to the gate line.

4. The device of claim 1, further comprising:
   a thin film transistor formed at a crossing of the gate line and the data line.

5. The device of claim 1, further comprising an insulating film between the color filter and the pixel electrode, and between the color filter and the common electrode.

6. The device of claim 5, wherein the insulating film includes one of silicon nitride and silicon oxide.

7. The device of claim 1, wherein the data line and the common electrode parts form a zigzag pattern.

8. The device of claim 1, wherein a height difference between the black matrix and the color filter is less than 0.2 times a thickness of the color filter.

9. A method for fabricating an array substrate of a liquid crystal display device, comprising:
   crossing a gate line and a data line on a substrate, thereby defining a pixel region;
   forming common electrode parts at both sides of the data line to shield the data line, the common electrode parts being separated from the data line;
   forming a thin film transistor at a region defined by the gate line and the data line crossing each other, wherein the thin film transistor includes a gate electrode, an active layer and a source electrode and a drain electrode;
   arranging a black matrix over the data line and a portion of the common electrode parts, wherein the black matrix overlaps portions of the substrate between the data line and the common electrode parts;
   forming a color filter on a pixel region defined by the gate line and the data line crossing each other; and
   forming a common electrode and a pixel electrode at the pixel region, wherein the common electrode overlaps the gate line, the data line and the common electrode parts.

10. The method of claim 9, wherein forming the common electrode parts includes horizontally forming a common electrode line spaced apart from the gate line, the common electrode parts extending from the common electrode line.

11. The method of claim 9, further comprising:
    forming an insulation film between the color filter, the pixel electrode and the common electrode.

12. The method of claim 11, wherein the insulation film includes one of silicon nitride and silicon oxide.

13. The method of claim 9, wherein the data line and the common electrode parts are arranged in a zigzag pattern.

14. The method of claim 9, wherein a height difference between the black matrix and the color filter is less than 0.2 times a thickness of the color filter.

15. A liquid crystal display device, comprising:
    a plurality of gate lines and a plurality of data lines crossing each other to define a pixel region on a substrate;
    a plurality of common electrode lines, each of the common electrode lines spaced apart from and parallel to a corresponding one of the gate lines;
    a pair of common electrode parts corresponding to each one of the data lines, the common electrode parts extending from the common electrode line, and arranged at both sides of the one of the data lines to shield the data lines;
    a black matrix over a region including the data lines and a portion of the common electrode parts;
    a color filter arranged at the pixel region; and
    a common electrode at the black matrix and the pixel region,
    wherein the common electrode overlaps the gate lines, the data lines and the common electrode parts.

16. The device of claim 15, further comprising a pixel electrode electrically connected to a drain electrode of a thin film transistor through a drain contact hole, wherein the pixel electrode overlaps the drain electrode.

17. The device of claim 16, wherein the pixel electrode includes vertical portions extending from the pixel electrode.

18. The device of claim 16, wherein the common electrode includes vertical portions extending from the common electrode and disposed between the vertical portions of the pixel electrode.

19. The device of claim 18, wherein the common electrode contacts the common electrode line at an outer edge of the pixel region.

* * * * *